United States Patent [19]

Sette et al.

[11] 4,170,270
[45] Oct. 9, 1979

[54] APPARATUS FOR PREVENTING THE OVERLOAD OF A LOAD CELL

[75] Inventors: Paul R. Sette, Hamden, Conn.; Anthony Storace, Tarrytown, N.Y.

[73] Assignee: Pitney-Bowes, Inc., Stamford, Conn.

[21] Appl. No.: 919,088

[22] Filed: Jun. 26, 1978

[51] Int. Cl.² ............................................. G01G 21/10
[52] U.S. Cl. ................................. 177/184; 73/141 A; 177/229
[58] Field of Search ............... 177/229, 154, 156, 184, 177/187, 188, 189, 211; 73/141 A

[56] References Cited

U.S. PATENT DOCUMENTS

| | | | |
|---|---|---|---|
| 2,720,111 | 10/1955 | Clark | 177/211 X |
| 3,477,532 | 11/1969 | Wilder | 177/211 |
| 3,577,779 | 5/1971 | Laimins | 73/141 A |
| 4,036,316 | 7/1977 | Rock | 177/DIG. 3 |
| 4,037,675 | 7/1977 | Storance | 177/229 |

*Primary Examiner*—Joseph W. Hartary
*Attorney, Agent, or Firm*—Peter Vrahotes; William D. Soltow, Jr.; Albert W. Scribner

[57] ABSTRACT

An apparatus for preventing the overload of a load cell used to measure deflection by providing a safety mechanism that will act upon the support of the load cell when an overload condition is reached. The invention is described in the environment of a leaf spring weighing scale that uses load cells to measure deflection of a load support.

10 Claims, 1 Drawing Figure

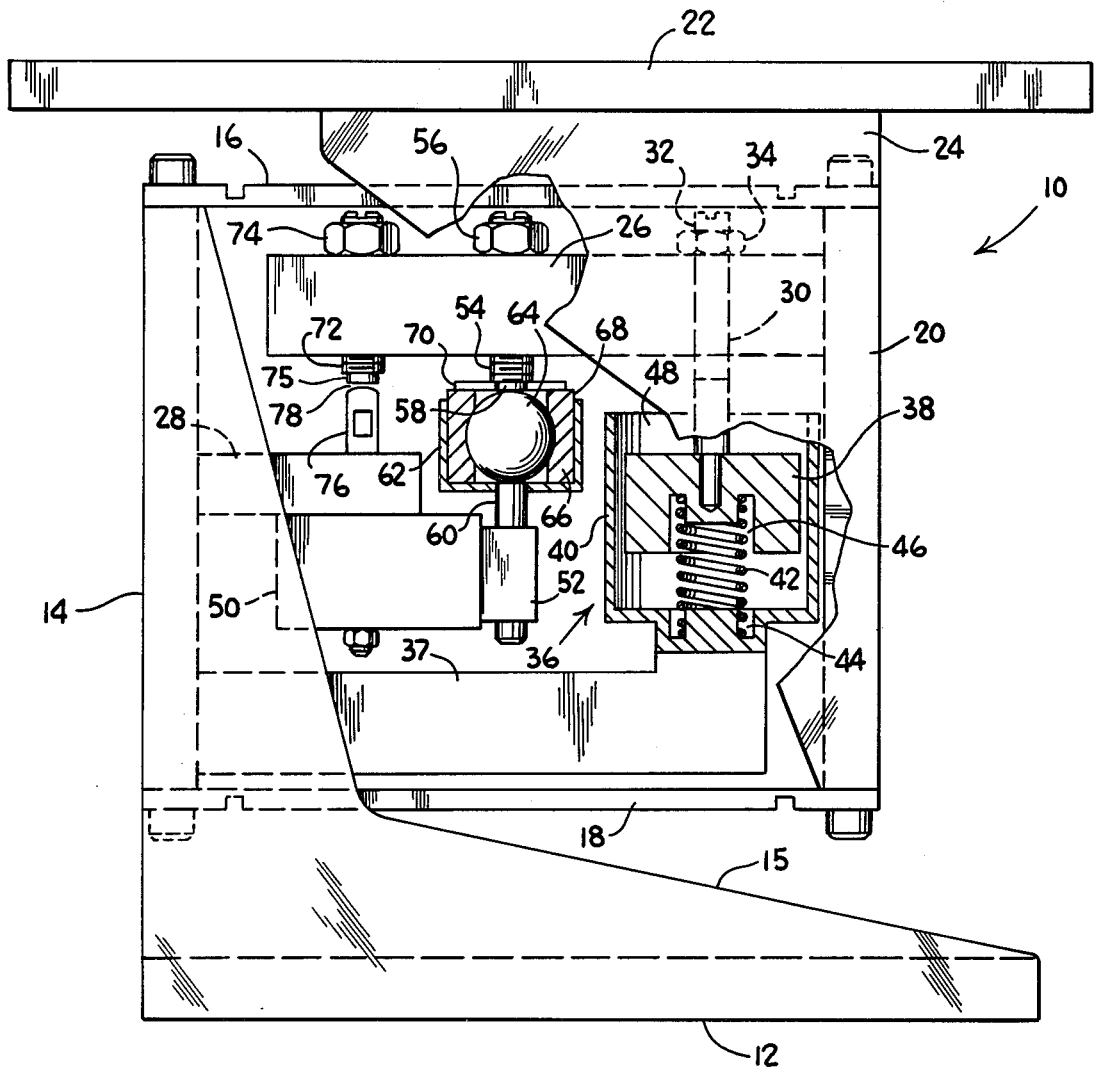

APPARATUS FOR PREVENTING THE OVERLOAD OF A LOAD CELL

BACKGROUND OF THE INVENTION

There are many enviroments in which load cells are used for the purpose of determining forces applied to an object. One such environment is a weighing scale wherein the strain of a load cell is measured to determine the weight of an object that is placed on a load support. An example of such a weighing scale that uses load cells may be found in U.S. Pat. No. 4,037,675. Where a load cell is used to measure the force on an object, safety measures are normally taken to assure that the strain gauge used in the load cell will not be acted upon so greatly that the load cell is damaged or destroyed. Prior art safety measures normally involve a pair of opposed load ends that are spaced relative to one another such that the amount of extension of the load cell is limited. The shortcoming of such safety measures is that any object, such as a bearing surface, normally has a degree of resiliency or yield so that if an extremely heavy object is dropped from a great distance upon the mechanism in connection with the load cell, the safety device would yield sufficiently so that the load cell would be damaged or destroyed.

SUMMARY OF THE INVENTION

It has been found that load cells used to determine the amount of force on a member may be protected by connecting a safety device to the support of the load cell in such a way that the load cell is removed from any acting forces when an overload condition is approached. The invention is described in the conjunction with a weighing scale wherein the load cell is supported upon a beam fixed to a fixed base and there is a connection between the load cell and the movable support of the weighing scale. Additionally, the load cell supporting beam has a connection with the movable support of the weighing scale such that when an overload condition is approached the connection will act upon the beam thereby pushing the beam sufficiently out of the way so that any forces acting upon the load cell are dimished as further load is applied.

BRIEF DESCRIPTION OF THE DRAWING

The single FIGURE shows a longitudinal cross sectional view of a weighing scale that incorporates the instant invention with portions removed for clarity.

DETAILED DESCRIPTION OF THE INVENTION

A weighing scale that illustrates the present invention is shown generally at 10 and is of the type that is described in U.S. Pat. No. 4,037,675, the reader being referred to said patent for details of construction of such a weighing scale. The weighing scale 10 includes a housing 12 to which a fixed member 14 is secured as by opposed gussets 15 (only one being shown). An upper leaf spring 16 and a lower leaf spring 18 are secured to the fixed member 14 and extend horizontally therefrom. A movable support 20 is connected to the leaf springs 16, 18, therebeing a pan 22 secured to the movable support as by opposed gussets 24 which are also secured to the upper leaf spring. The fixed member 14, leaf springs 16, 18 and movable support 20 form a parallelogram structure. The pan 22 is adapted to receive a load that would cause deflection of the leaf springs 16, 18 and substantially linear motion of the movable support 20 in response thereto.

A beam 26 is integral with the movable support 20 and another beam 28 is integral with the fixed member 14. A threaded piston rod 30 having a slotted end 32 extends through the beam 26, therebeing a locking nut 34 secured to the end thereby holding the piston rod. The piston rod 30 is threaded so that its position within the beam 26 may be adjusted in cooperation with the nut 34. A damping mechanism, shown generally at 36 receives the piston rod 30. The damping mechanism 36 is supported upon a base 37 that is integral with the fixed member 14. The damping mechanism 36 includes a piston 38 that is received within a generally cylindrical housing 40. The piston rod 30 is secured to the piston 38. A spring 42 extends from the piston 38 to the bottom of the housing 40, one end of the spring being received within an annulus 44 located in the lower portion of the housing and the other end within an annulus 46 located at the bottom of the piston. Fluid 48 is disposed within the housing 40 so as to complete the damping mechanism structure.

A load cell 50 is connected to the beam 28 and has a load contact portion 52 extending therefrom. A threaded rod 54 having a slotted upper end extends through the beam 26, therebeing a locking nut 56 to secure the threaded rod to its adjusted position. The rod 54 forms a button 58 at the lower end thereof. Another rod 60 is fixedly disposed within the load contact portion 52 and is received within a ball housing 62. A sphere 64 is received within the ball housing 62, therebeing a resilient wall 66 intermediate the housing and sphere with curvilinear portion 68 that is formed by the curvature of the sphere. The resilient wall 66 allows freedom of movement of the sphere 64. A plate 70 is in contact with the button 58 so as to provide engagement of the latter with the resilient wall 66.

Another threaded rod 72 having an upper slotted end is disposed within the beam 26 and has a nut 74 at the top thereof, the nut being provided to allow locking after adjustment of the rod within the beam. The lower end of the rod 72 forms a button 75. A pin 76 is secured to the beam 28 therebeing a space or gap 78 between the upper portion of the pin and the button 75. The size of the gap 78 is adjustable as the vertical position of the rod 72 relative to the pin 76 may be varied as a consequence of its threaded perimeter and slotted end.

When a load is placed upon the pan 22 the movable support 20 will deflect downwardly thereby moving the beam 26 therealong. As the beam 26 is deflected downwardly, the button 58 will urge the sphere 64 downwardly against the rod 60 thereby creating a strain upon the load cell 50 due to the deflection thereof. Because of the stress caused in the load cell 50 resulting from the defection, the resistance of the load cell will be changed proportionately thereby allowing one to measure the amount of change and calculate the weight of the load on the pan 22 as is well known in the art. The damping mechanism 36 is provided to render the movement of the movable support 20 and its associated members uniform as is also well known in the art.

When an unusually heavy load is placed upon the pan 22, or the load is dropped upon the pan 22 to create a force such that would tend to damage or destroy the load cell 50, the amount of deflection resulting thereof will cause the button 75 to engage the pin 76 to force the beam 28 downwardly. Obviously, adjustment of the gap 78 between the button 75 and pin 76 as previously described is provided so that the two will meet when an overload condition is approached. When the beam 28 is deflected through contact of the button 75 and pin 76, the load cell 50 will experience a greater deflection at the location of the load contact portion 52 than the pin because the location of the load contact portion, and the sphere 64, is further from the fixed end of the beam 28. Consequently, as the beam 28 is bent by the contact force, the slope of the beam 28 causes the portion of the beam in vertical alignment with the sphere 64 and load contact portion 52 to experience a greater deflection than at the pin 76 thereby causing a reduction in the force applied to the load cell 50. It will be noted that the pin 76 is not secured to a fixed member such that would cause compression thereof upon a large force being applied thereto. Instead, the beam 28 provides a yieldable support to prevent such compression.

What is claimed is:

1. A weighing scale comprising:
a housing, a movable support structure connected to said housing by a pair of upper and lower spaced apart leaf springs so arranged to form a parallelogram for providing substantially linear motion to said support structure, a weighing pan for receiving a load supported by said support structure, a beam supported by said housing and received within said parallelogram, load cell means secured to said beam, first contact means for providing engagement between said support structure and said load cell means and second contact means for providing engagement between said beam and said support structure.

2. The weighing scale of claim 1 wherein said second contact means is intermediate the location where said beam is supported by said housing and said first contact means.

3. A weighing scale comprising:
a housing, a movable support structure secured to said housing, a weighing pan for receiving a load supported by said support structure, a deflecting beam supported by said housing, a load cell secured to said beam, a load member extending from said support structure and engageable with said load cell when a load is placed upon said pan, and a pin extending from said load member toward said beam to form a gap therebetween.

4. The weighing scale of claim 3 wherein said pin is located intermediate the location where said beam is supported by said housing and the location where said load member is engageable with said load cell.

5. Apparatus for preventing overload on a load cell used in an apparatus to determine forces applied thereto comprising:
a deflecting member, a load cell supported by said deflecting member, a load member engageable with said load cell, a pin extending from said deflecting member and spaced relative to said load member.

6. The apparatus of claim 5 including means for adjusting the distance between said pin and said load member when no force is applied to the load cell.

7. Apparatus for preventing overload on a load cell used in a device to determine the amount of force applied thereto, comprising:
a deflecting member, a load cell supported by said deflecting member, a load member engageable with said load cell, a first pin extending from said deflecting member and spaced relative to said load member, a second pin extending from said load member and spaced relative to said first pin to form a gap therebetween.

8. The apparatus of claim 7 including means for adjusting the size of said gap.

9. Apparatus for preventing overload on a load cell used in a device to determine a force applied thereto, comprising:
a deflecting member having a stationary end and a movable end, a load cell supported by said deflecting member adjacent said movable end, a load member engageable with said load cell, a first pin extending from said deflecting member and spaced relative to said load member, said first pin being located intermediate stationary end and said load cell, a second pin extending from said load member and spaced relative to said first pin to form a gap therebetween.

10. The apparatus of claim 9 including means for adjusting the size of said gap.

* * * * *

UNITED STATES PATENT AND TRADEMARK OFFICE
CERTIFICATE OF CORRECTION

PATENT NO. : 4,170,270

DATED : Oct. 9, 1979

INVENTOR(S) : Paul R. Sette, Anthony Storace

It is certified that error appears in the above-identified patent and that said Letters Patent are hereby corrected as shown below:

Column 1, line 44, change "dimished" to -- diminished --.

Column 2, line 56, change "defection" to -- deflection --.

Column 2, line 56, change "resistence" to -- resistance --.

Signed and Sealed this

Twenty-sixth Day of October 1982

[SEAL]

Attest:

Attesting Officer

GERALD J. MOSSINGHOFF

Commissioner of Patents and Trademarks